Figure 1:
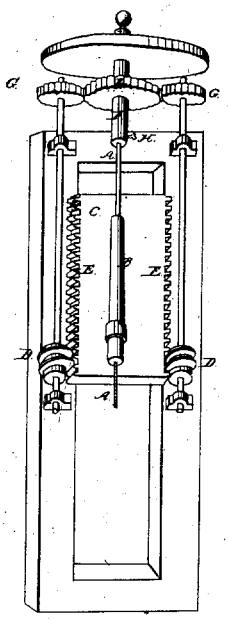
Figure 6:
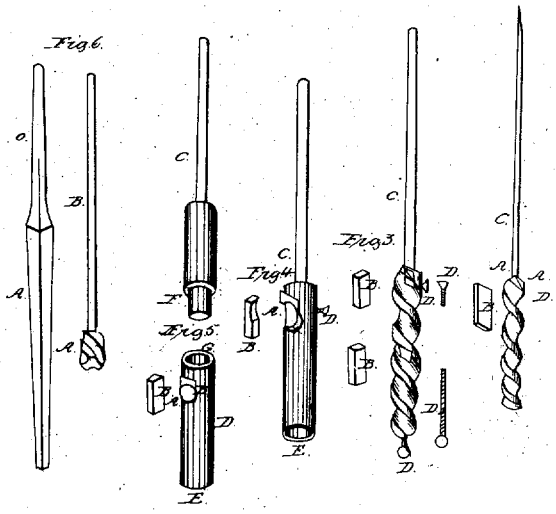

No Printed Specification Available

2064X

D. Pettibone,

Boring Gun Barrels,

Patented Feb. 12, 1814.

98 [illegible] 12 Feb 1814 2061X

To all to whom These Presents shall come, Greeting

I certify, That the annexed are true Copies of the petition
Specification on oath of invention, drawings and reference [illegible]
drawings of an improvement in boring Muskets, Pistol & Rifle
Barrels, by an Auger, called the Spiral Groove or twisted [illegible]
Auger for which Daniel Pettibone obtained a patent the 12[illegible]
day of February 1814.

(Seal)

In Faith Whereof, I James Monroe Secretary
for the Department of State of the United States of
America, have signed these presents, and caused the
Seal of my office to be affixed hereto, at the City of
Washington, this nineteenth day of March A.D. 1[illegible]
and the the thirty ninth year of the Independence of
the said States.

Jas Monroe

To the honorable James Monroe Esqr Secretary of State of the
United States of America. — The petition of Daniel Pettibo[illegible]
now of Philadelphia edge-tool maker humbly sheweth— Th[illegible]
he did invent construct and apply to use in the year 179[illegible]
new and useful improvement in the manner of boring Mu[illegible]
pistol, or rifle barrels— by means of peculiar constructed auge[illegible]
or bitts, (called the spiral grove or twisted screw auger or bi[illegible]
(vide Specification) A model of the Auger and a written de[illegible]
cription of his improvement were filed or deposited in t[illegible]
Office of State (when in this city) in the months of January
and August in the year above mentioned.

Your petitioner is therefore desirous of obtaining an exclusive
proper— in his said invention and humbly prays that letters Paten[illegible]
duly executed according to law may be granted him for his sa[illegible]
invention as in duty bound will ever pray. Your most obt [illegible]

Daniel Pettibo[illegible]

Philadelphia
31. March 1812

Specification. To all persons to whom these presents shall
come- Daniel Pettibone edge-tool maker sends greeting.
Be it known that I Daniel Pettibone did invent and
apply to use in the year 1799- a new an useful improve-
ment in the manner of boring musket, pistol or rifle barrels
by an auger (called the Spiral grove or twisted screw auger)
The invention of the spiral groove or twisted screw auger for
the purpose of boring Musket, pistol, or rifle barrels, consists
in the manner of makeing it; or the particular form or construc-
tion of the same; as also the mode of application.
First - These augurs I make of the best cast or other good
steel welded to a handle or shank of good iron or steel. Then
they are forged hammered & twisted in a similar manner to the
common screw auger, used by Carpenters for boring wood-
excepting the plate is left thicker before it is twisted. The
difference in the form of this improved auger from the
common screw auger and for boring wood. are that the
points or cutters are next to the shank; and that the auger
is less twisted for boring iron than for boring wood.
The shank of the auger is long enough to put through the barrel
and fasten to the socket of the machine that moves or turns
the auger. The auger revolves about once per second and the
points or Cutters are pressed against the iron that is to be
bored from the inside of the barrel: By the force or applica-
tion of one or more endless screws that revolve in a rack of
coggs attached to the Carriage on which the barrels are fastened
These endless screws revolve very slowly so as to give time for
the augurs to cutt all that is required.— My further
improvement is the placeing of the barrels perpendicular
The improved auger can be well applied if the barrels are placed
horizontally. The size of the shank of the augers are about
an eight of one inch less than the screw or cutters I consider it of much consequence to file or make the point
of the cutters flat in the front so as to give the chips a proper
direction into the grooves. I make use of several different
sizes to bore a barrel:— the shank of the second auger, for
about four or five inches from the cutters is just as large
as the cutters of the first and the shank of the third the same
size as the cutters of the second &c. &c. &c.
Secondly— For convenience of repairs I put a piece of cast
or other good Steel about one eight of an inch square through
the shank next to the twisted part to form points or cutters.
Thirdly I have also made augers by forging and turning
very smoothly in a lathe a bolt or pin of good steel - six or
seven inches long - It was then welded to a shank at one end -
And within one or two inches of the other I put through a
piece of steel to form points or cutters. This piece of steel
is secured in its place by a small screw entering the end or
side of the bolt or pin.— And from the points or cutters.—
Spiral grooves are cut to the end.
Fourth — In some instances I cause the barrel to revolve
instead of the auger for the purpose of boring more straight and
true. The twisted part of the auger is best to be four or five inches
long. I frequently repair the points or cutters of the twisted
augers with a steel punch or set, by heating the auger to a
red heat - and temper it again.
Fifth — I sometimes make these bolts or pins hollow from
the cutters or points to the end.— So that the chips may pass off
internally; instead of passing off in the spiral grooves on the
outside. I also make bolts, pins, or hollow cylinders that screw
together some what like the joints of a common flute or clari-
net that when screwed together - the cutters or points are
fastened in its place - the chips or borings pass off inter-
nally or externally as circumstances may require.

The Advantages of the five Articles.

Article Firstly- The screw auger is more easily made & kept in repair than any other; and will bore the straight-est without injury to the barrel; and of an excellent size alli bore.

Art. Secondly By putting moveable cutters to the screw auger or to the other kind, they will last a long time, as only the cutters will need repairing.

Art. Thirdly- The placeing the barrels perpendicular to be bored is a great improvement as it will save much room in a building or factory.- And one man can tend ten or twelve augers at once.- Also the chips will drop out conven-iently.

Art. Fourthly- The endless screw rack of cogs is a matter of consequence to give a regular pressure against the cutters.

Art. Fifthly The makeing of hollow augers for the purpose of passing of the chips internally is very convenient.- But there is none of the simplicity of the twisted screw and so easily made by a common workman & tools Witness Signed Daniel Pettibone L. P. L. Muhlenburg Jas. J. Rush Jacob Baker City and County of Philadelphia ss. Personally appeared the above named Daniel Pettibone and being duly cautioned made solemn oath on the holy Evangelists of Almighty God:- That he verily believes himself to be the first inventor of the improved method of makeing augers or bitts for boreing Musket, pistol, & Rifle barrels, as above specified and described.— And that he is a City- of the united States of America Signed Daniel Pettibone Sworn the 31. day of March 1812 before me Jacob Baker Ald:

Endorsed on the Back- Mr. Ther[illegible] informed me that he had seen gun [illegible] bored while standing perpendicularly & the muzzle downwards twenty nine years ago Feb 12th 1814 Daniel Pettibone [illegible]

(1452 words)

[illegible]